United States Patent
Suzuki et al.

(10) Patent No.: US 8,432,246 B2
(45) Date of Patent: Apr. 30, 2013

(54) ELECTRIC CIRCUIT BREAKER APPARATUS FOR VEHICLE

(75) Inventors: Shigeyuki Suzuki, Kiyosu (JP); Takaki Fukuyama, Kiyosu (JP); Toshinori Tanase, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 196 days.

(21) Appl. No.: 12/801,732

(22) Filed: Jun. 23, 2010

(65) Prior Publication Data
US 2010/0328014 A1 Dec. 30, 2010

(30) Foreign Application Priority Data

Jun. 29, 2009 (JP) .................................. 2009-154134
Apr. 26, 2010 (JP) .................................. 2010-101347

(51) Int. Cl.
*H01H 39/00* (2006.01)
*H01H 37/76* (2006.01)

(52) U.S. Cl.
USPC ........... 337/157; 337/401; 337/405; 361/115; 200/61.08

(58) Field of Classification Search ............... 337/30, 337/157, 401, 405; 361/115; 200/61.08
See application file for complete search history.

(56) References Cited

U.S. PATENT DOCUMENTS

| | | | | | |
|---|---|---|---|---|---|
| 3,277,255 | A | * | 10/1966 | Mattsson et al. | 200/61.08 |
| 3,660,794 | A | * | 5/1972 | Brizzolara | 337/401 |
| 3,873,786 | A | * | 3/1975 | Lagofun | 200/61.08 |
| 3,915,236 | A | * | 10/1975 | Stichling | 169/61 |
| 3,932,717 | A | * | 1/1976 | Dike et al. | 200/61.08 |
| 4,224,487 | A | * | 9/1980 | Simonsen | 200/61.08 |
| 4,311,890 | A | * | 1/1982 | Schroder | 200/61.08 |
| 4,417,519 | A | * | 11/1983 | Lutz | 102/263 |
| 5,070,787 | A | * | 12/1991 | Weldon et al. | 102/216 |
| 5,535,842 | A | * | 7/1996 | Richter et al. | 180/279 |
| 5,877,563 | A | * | 3/1999 | Krappel et al. | 307/10.1 |
| 6,194,988 | B1 | * | 2/2001 | Yamaguchi et al. | 337/157 |
| 6,222,439 | B1 | * | 4/2001 | Tanigawa et al. | 337/401 |
| 6,232,568 | B1 | * | 5/2001 | Hasegawa et al. | 200/61.08 |
| 6,295,930 | B1 | * | 10/2001 | Kume et al. | 102/202.5 |
| 6,418,005 | B1 | | 7/2002 | Endo et al. | |
| 6,483,420 | B1 | * | 11/2002 | Takahashi et al. | 337/401 |

(Continued)

FOREIGN PATENT DOCUMENTS

DE 197 12 387 A1 10/1997
EP 0 929 090 A2 7/1999

(Continued)

OTHER PUBLICATIONS

Office Action dated Sep. 13, 2012 issued in Chinese patent application No. 201010213066.0 (and English translation).

*Primary Examiner* — Anatoly Vortman
(74) *Attorney, Agent, or Firm* — Posz Law Group, PLC

(57) ABSTRACT

An electric circuit breaker apparatus is used in a vehicle including an electric circuit having a converter and a storage battery. The electric circuit breaker apparatus interrupts power supply from the storage battery to the converter when a collision of the vehicle is detected. The electric circuit breaker apparatus includes a power supply circuit breaker driven by a low explosive type actuator, which is actuated when a collision of the vehicle is detected. Actuation of the power supply circuit breaker interrupts a power supply path connecting a positive terminal of the storage battery to the converter and grounds a portion of the power supply path closer to the converter than the interrupted portion.

6 Claims, 4 Drawing Sheets

U.S. PATENT DOCUMENTS

| | | |
|---|---|---|
| 6,519,128 B1 | 2/2003 | Nakamura et al. |
| 6,556,119 B1 * | 4/2003 | Lell ............................... 337/157 |
| 6,843,157 B2 * | 1/2005 | Hamilton et al. ............ 83/639.4 |
| 7,123,124 B2 * | 10/2006 | Caruso et al. ................. 337/157 |
| 7,205,879 B2 * | 4/2007 | Kordel et al. ................. 337/401 |
| 7,222,561 B2 * | 5/2007 | Brede et al. .................. 83/639.4 |
| 7,772,958 B2 * | 8/2010 | Schlotzer ...................... 337/157 |
| 2003/0116413 A1 * | 6/2003 | Narusevicius et al. .... 200/50.21 |
| 2004/0041682 A1 * | 3/2004 | Pasha et al. .................. 337/401 |

FOREIGN PATENT DOCUMENTS

| | | |
|---|---|---|
| JP | 56-357 U | 1/1981 |
| JP | A-10-297393 | 11/1998 |
| JP | 2000-149746 A | 5/2000 |
| JP | 2000-156142 A | 6/2000 |

* cited by examiner

US 8,432,246 B2

ELECTRIC CIRCUIT BREAKER APPARATUS FOR VEHICLE

BACKGROUND OF THE INVENTION

The present invention relates to an electric circuit breaker apparatus for interrupting an electric circuit mounted in a vehicle such as an automobile.

Typically, a vehicle includes lights such as head lights, various types of electric devices including an electric motor for driving wipers, and a storage battery. The electric devices are operated by the power supplied from the storage battery.

When the vehicle is damaged in a car collision, leakage may occur in any of the electric circuits formed by the electric devices and the storage battery. If the vehicle is multifunctional like many cars in these days and has a great number of electric devices and, correspondingly, a great capacity storage battery, undesirable influence by the leakage, such as a failure of electric devices, cannot be ignored.

To solve this problem, Japanese Laid-Open Utility Model Publication No. 56-357 discloses an apparatus for interrupting the connection between a storage battery from an electric device when a car collision occurs. The apparatus has a fuse arranged between the storage battery and the electric device. When the car collision happens, a high current is forcibly supplied to the fuse, thus blowing the fuse. This interrupts the supply of power from the storage battery to the electric device, thus preventing leakage from electric circuits.

Specifically, the portion of the electric circuit closer to the electric device than the portion of the electric circuit interrupted by the fuse does not receive the power. Leakage is thus reliably prevented in the portion of the electric circuit closer to the electric device.

The electric device includes elements that accumulate charge when the electric device is in operation, or specifically when the electric device receives power. The elements include, for example, a capacitor. If a vehicle includes an electric device having such an element and the connection between the storage battery and the electric device is interrupted when a car collision occurs, the potential of a portion of the electric circuit closer to the electric device than the interrupted portion may be maintained excessively high due to the charge accumulated in the electric device. This is an undesirable situation.

SUMMARY OF THE INVENTION

Accordingly, it is an objective of the present invention to provide an electric circuit breaker apparatus for a vehicle capable of preventing an excessively high potential in a portion of an electric circuit after a car collision.

To achieve the foregoing objective and in accordance with one aspect of the present invention, an electric circuit breaker apparatus used in a vehicle having an electric circuit including an electric device and a storage battery for supplying power to the electric device is provided. The electric circuit breaker apparatus interrupts supply of the power from the storage battery to the electric device when a collision of the vehicle is detected. The apparatus includes a power supply path and a power supply circuit breaker. The power supply path connects the electric device and a positive terminal of the storage battery to each other. The power supply circuit breaker is arranged in the power supply path. The power supply circuit breaker includes a low explosive type first actuator. The first actuator is actuated to drive the power supply circuit breaker when the collision is detected. When the first actuator is actuated, the power supply circuit breaker interrupts the power supply path and grounds a portion of the power supply path closer to the electric device than the interrupted portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

An electric circuit breaker apparatus for a vehicle according to a first embodiment of the present invention will now be described.

Figure 1:
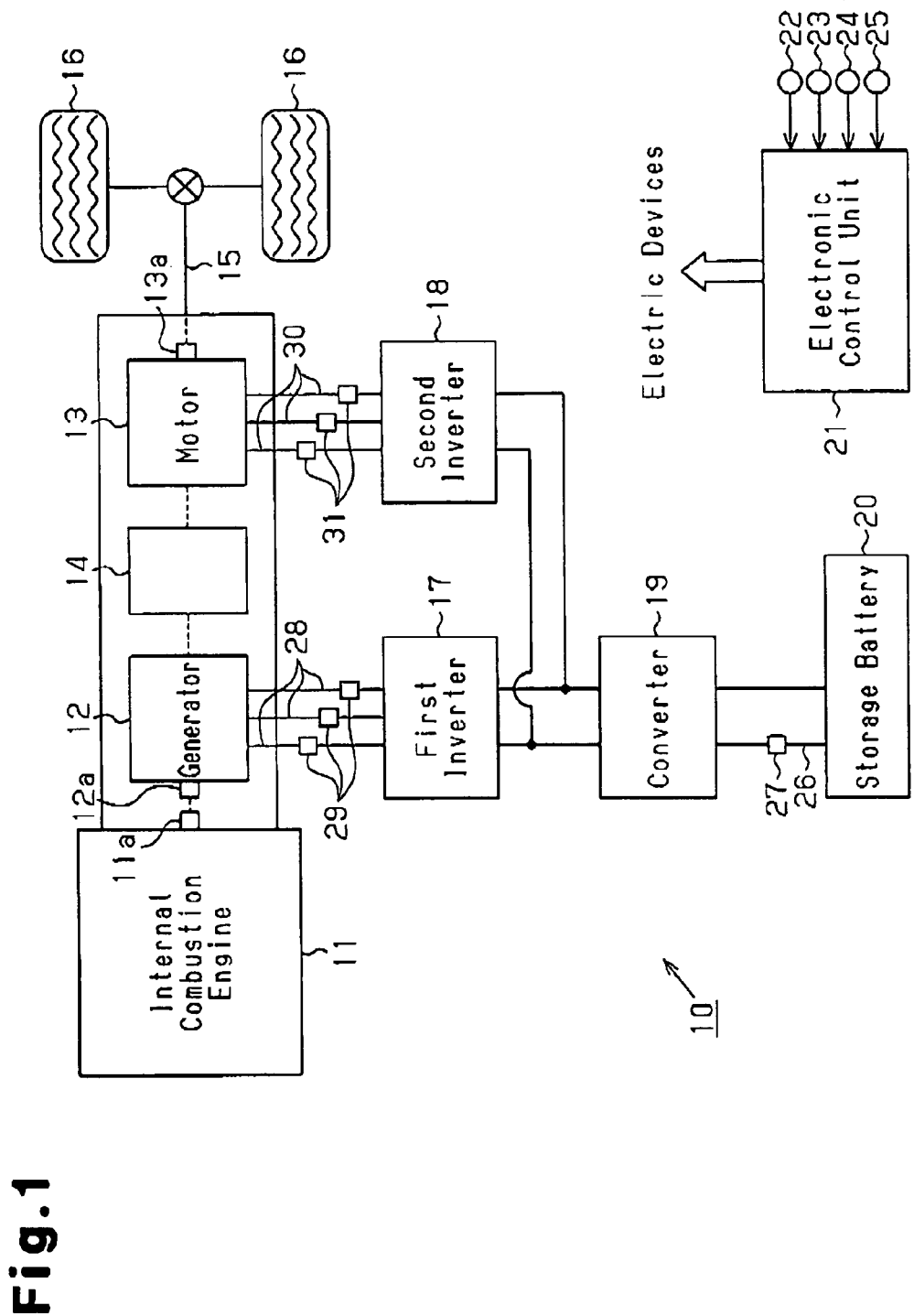
FIG. 1 is a diagram showing a vehicle having an electric circuit breaker apparatus according to a first embodiment of the present invention.

FIG. 1 schematically illustrates the configuration of a vehicle including the electric circuit breaker apparatus of the present embodiment.

With reference to FIG. 1, an internal combustion engine 11 serving as a drive source is mounted in a vehicle 10. An output shaft 11a of the engine 11 is connected to an axle 15 through a generator 12, a motor 13, and a power split device 14. Drive wheels 16 are connected to the axle 15. The generator 12 functions mainly as a power generator that generates power through forcible rotation caused by the output shaft 11a of the engine 11. The motor 13 functions mainly as an electric motor that produces torque to be applied to the axle 15. As the generator 12 and the motor 13, three-phase alternating current type rotary devices are employed. The power split device 14 splits the rotation torque of the output shaft 11a of the engine 11 into torque for driving a rotary shaft 12a of the generator 12 and torque for driving the axle 15.

The vehicle 10 has a first inverter 17 and a second inverter 18. The first inverter 17 is connected to the generator 12 and controls operation of the generator 12. The second inverter 18 is connected to the motor 13 and controls operation of the motor 13. In the present embodiment, the first inverter 17 and the second inverter 18 each function as a controller for controlling operation of the rotary device. The first inverter 17 and the second inverter 18 both incorporate a three-phase bridge circuit configured by six switching elements and are connected to a storage battery 20 through a converter 19. The converter 19 adjusts the supply voltage from the storage battery 20 to the inverters 17, 18 and the charge voltage from the inverters 17, 18 to the storage battery 20.

The vehicle 10 has an electronic control unit 21 configured mainly by, for example, a microcomputer. The electronic control unit 21 receives output signals from various types of sensors. The sensors include, for example, an accelerator sensor 22 for detecting the depression amount of an accelerator pedal (not shown), a brake sensor 23 for sensing whether a brake pedal (not shown) is depressed, a speed sensor 24 for detecting the traveling speed of the vehicle 10, and an impact sensor 25 for sensing whether a car collision has occurred to the vehicle 10.

The electronic control unit 21 receives the output signals from the sensors 22, to 25 and performs various types of calculations in response to the output signals. Based on such calculation results, the electronic control unit 21 carries out various types of control related to operation of the vehicle 10, including operation control of the engine 11 and the inverters 17, 18.

Such control is performed basically in accordance with the concept described below.

If the vehicle 10 runs on the torque generated by the engine 11 when, for example, the vehicle 10 is started or runs under light load, the engine 11 operates with low efficiency. In these situations, the motor 13 is driven by the power supplied from the storage battery 20 and the vehicle 10 runs on the torque generated by the motor 13.

Contrastingly, when the engine 11 can be operated with high efficiency, such as when the vehicle 10 is in a constant running state, the engine 11 is operated to allow the vehicle 10 to run on the torque generated by the engine 11. In this state, the rotary shaft 12a of the generator 12 is forcibly rotated by the output shaft 11a of the engine 11, thus causing the generator 12 to generate the power. The generated power drives the motor 13. The torque produced by the motor 13 is consumed by the vehicle 10 to run.

If great torque is necessary for the vehicle 10 to run, such as when the vehicle 10 accelerates, the engine 11 is operated and the motor 13 is driven by the power supplied from the storage battery 20. The vehicle 10 thus runs on the torque generated by the engine 11 and the torque generated by the motor 13.

When the vehicle 10 decelerates, the axle 15 forcibly rotates the rotary shaft 13a of the motor 13. This causes the motor 13 to function as a power generator. The motor 13 thus generates braking force to brake rotation of the axle 15 and charge the storage battery 20 with the power generated by the motor 13.

When the amount of the power remaining in the storage battery 20 is small, the rotary shaft 12a of the generator 12 is forcibly rotated by the output shaft 11a of the engine 11 to cause the generator 12 to generate the power. The storage battery 20 is charged with the generated power.

When the engine 11 is started, the generator 12 is driven by the power supplied from the storage battery 20, thus applying assist torque to the output shaft 11a of the engine 11 to start the engine 11.

As has been described, in the present embodiment, rotary devices each having two functions are employed as the generator 12 and the motor 13. Specifically, each rotary device has a power generating function for generating power through forcible rotation of a rotary shaft and a torque producing function for producing rotation torque using the power supplied from the storage battery 20.

When the vehicle 10 is damaged, for example, in a car collision, leakage may occur from any of the electric circuits configured by the motor 13, the generator 12, the inverters 17, 18, the converter 19, and the storage battery 20.

To prevent such leakage, in the present embodiment, a power supply circuit breaker 27 is provided. The power supply circuit breaker 27 interrupts a power supply path connecting the positive terminal of the storage battery 20 to the inverters 17, 18 at a collision of the vehicle 10. Specifically, a power supply cable 26, which extends from the positive terminal of the storage battery 20 to the converter 19, is disconnected by the power supply circuit breaker 27. The power supply circuit breaker 27 is actuated when the collision of the vehicle 10 is detected based on an output signal of the impact sensor 25. In this manner, the power supply path is interrupted and the supply of the power from the storage battery 20 to various types of electric devices is stopped.

The converter 19 incorporates a capacitor, which is specifically a smoothing capacitor for preventing fluctuations of input voltage. Accordingly, when the converter 19 operates, or specifically when the power is supplied to the converter 19, the capacitor accumulates charge. As a result, although the supply of the power from the storage battery 20 to the converter 19 is suspended through actuation of the power supply circuit breaker 27, the potential of a portion of the electric circuit closer to the converter 19 than the power supply circuit breaker 27 may become excessively high due to the charge accumulated by the converter 19.

To solve this problem, the power supply circuit breaker 27 of the present embodiment has a function of grounding the portion of the power supply path closer to the converter 19 than the interrupted portion, in addition to a function of interrupting the power supply path, when the power supply circuit breaker 27 is actuated. The power supply circuit breaker 27 incorporates a low explosive type actuator, which is actuated when a collision of the vehicle 10 is detected. The power supply circuit breaker 27 is driven through actuation of the actuator.

The power supply circuit breaker 27 mounted in the vehicle 10 enables the operation described below. Specifically, when a collision of the vehicle 10 is detected, the power supply path is interrupted. This prevents the potential of the portion of the power supply path closer to the converter 19 than the interrupted portion from being maintained at a high level due to the power supplied from the storage battery 20. Further, along with the interruption of the power supply path, the portion of the power supply path closer to the converter 19 than the interrupted portion is grounded. Specifically, the portion of the power supply path closer to the converter 19 than the interrupted portion is connected to a ground of the electric circuit through a resistor (not shown). The ground of the electric circuit specifically refers to the portion of the electric circuit that is connected to the negative terminal of the storage battery 20 and has a potential substantially equal to the potential of the negative terminal. This forms a discharging circuit in which the resistor is connected in parallel with the capacitor of the converter 19. Accordingly, even if charge is accumulated in the converter 19, the charge is discharged through the discharging circuit. This prevents the potential of the portion of the power supply path closer to the converter 19 from being maintained at a high level. As a result, the potential of the portion of the power supply path closer to the converter 19 than the interrupted portion is prevented from being maintained excessively high after a car collision has occurred to the vehicle 10.

To reduce portions with potentials increased by the power supplied by the storage battery 20, it is desirable to mount the power supply circuit breaker 27 at a position close to the storage battery 20.

The specific configuration of the power supply circuit breaker 27 will hereafter be described.

Figure 2A:
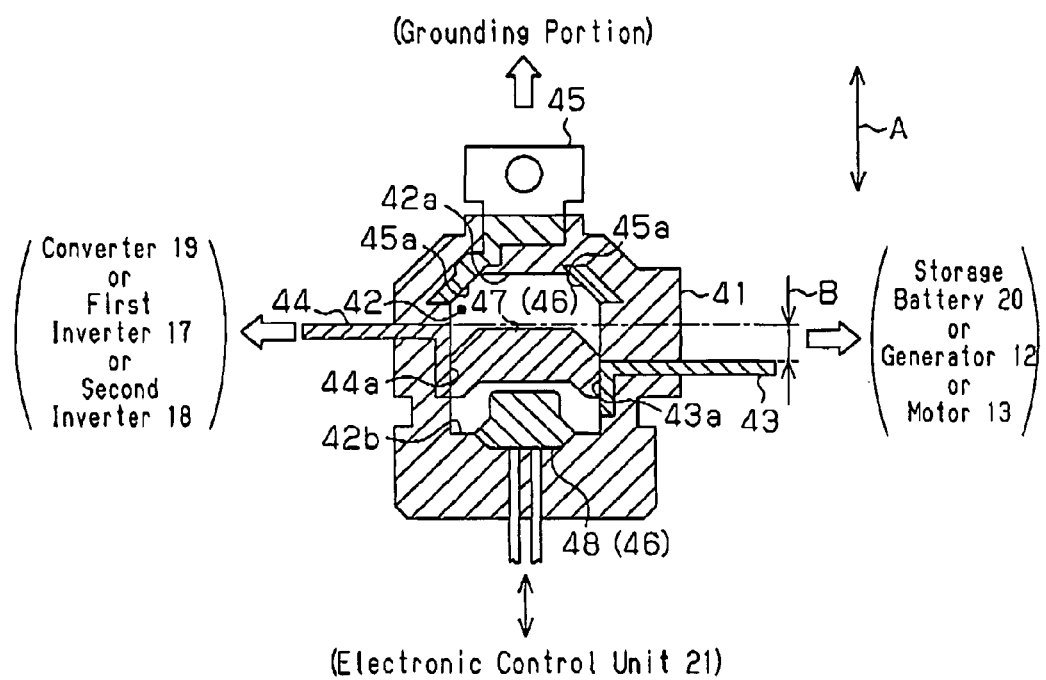
FIG. 2(a) is a cross-sectional view showing the interior of a circuit breaker shown in FIG. 1.
Figure 2B:
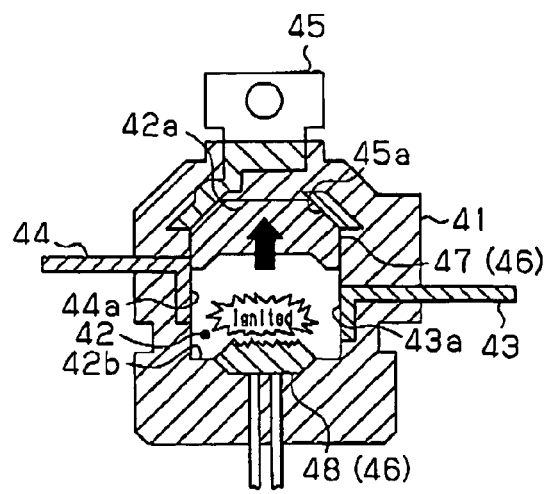
FIG. 2(b) is a cross-sectional view showing a state of the circuit breaker shown in FIG. 2(a) after actuation.

FIG. 2 shows the interior of a circuit breaker used as the power supply circuit breaker 27. Specifically, FIG. 2(a) shows the interior of the circuit breaker before an actuator is actuated. FIG. 2(b) shows the interior of the circuit breaker after the actuator is actuated.

With reference to FIGS. 2(a) and 2(b), a casing 41 of the circuit breaker has a substantially columnar internal space 42 formed in the casing 41.

The circuit breaker includes three terminals, which are formed at separate positions and connect the internal space 42 to the exterior of the casing 41. The three terminals are a first terminal 43, a second terminal 44, and a third terminal 45.

The first terminal 43 has a first contact 43a, which functions as a storage battery-side contact. The second terminal 44 includes a second contact 44a, which functions as an electric device-side contact. The first contact 43a and the second contact 44a are located in the inner circumferential surface of the casing 41 and exposed at central positions in the axial direction of the internal space 42, which is indicated by arrow A in FIG. 2(a). The third terminal 45 has a third contact 45a, which functions as an electric device ground contact. The third contact 45a is arranged in an inner surface of the casing 41 and exposed from an end at one side of the axial direction of the internal space 42, that is, at a top portion 42a. The second terminal 44 is shaped in such a manner that the end of the second contact 44a at the side corresponding to the top portion 42a is located closer to the top portion 42a than the end of the first contact 43a of the first terminal 43 at the side corresponding to the top portion 42a by a small amount, which is indicated by arrows B in FIG. 2(a). The first terminal 43 is connected to the positive terminal of the storage battery 20 and the second terminal 44 is connected to the converter 19. The third terminal 45 is connected to a grounding portion, which is specifically the ground of the electric circuit, through a resistor (not shown).

The circuit breaker incorporates a low explosive type actuator 46. The actuator 46 has a substantially columnar actuating portion 47, which is arranged in the internal space 42, and a gas generating portion 48 for generating combustion gas by igniting and burning low explosive in response to a signal from the electronic control unit 21. The gas generating portion 48 is attached to a bottom portion 42b at a position at one end of the internal space 42 in the axial direction of the internal space 42, that is, between the bottom portion 42b and the actuating portion 47. When the low explosive is ignited and burned in the gas generating portion 48 and combustion gas is produced, the combustion gas presses the actuating portion 47. This moves the actuating portion 47 from the bottom portion 42b to the top portion 42a in the internal space 42. Generally, the low explosive type actuator is quickly operable and inexpensive and has high operation reliability. In the present embodiment, the circuit breaker is driven by the low explosive type actuator 46. In the present embodiment, the actuating portion 47 functions as a movement member and a movable member.

Operation of the power supply circuit breaker 27 (see FIG. 1) will hereafter be described.

As illustrated in FIG. 2(a), before the actuator 46 is actuated, the actuating portion 47 is located at such a position that the actuating portion 47 does not contact the third contact 45a. Specifically, the actuating portion 47 is located at such a position that the actuating portion 47 contacts the first contact 43a and the second contact 44a, or in other words, that the actuating portion 47 is clamped between the first contact 43a and the second contact 44a. The actuating portion 47 is formed of conductive material, which is a material with a high electric conductivity such as iron based material. Accordingly, before the actuator 46 is actuated, the first contact 43a and the second contact 44a are connected to each other through the actuating portion 47 among the contacts formed in the circuit breaker. When such connection is bought about, the actuating portion 47 of the actuator 46 is used as a connection member for connecting the first contact 43a and the second contact 44a to each other. In other words, the actuating portion 47 is used as a portion of the power supply path connecting the positive terminal of the storage battery 20 to an electric device such as the converter 19.

After the actuator 46 is actuated as illustrated in FIG. 2(b), the actuating portion 47 is moved to such a position that the actuating portion 47 does not contact the first contact 43a but contacts the second contact 44a and the third contact 45a. Specifically, after the actuator 46 is actuated, the actuating portion 47 is moved from the position close to the bottom portion 42b toward the top portion 42a while contacting the second contact 44a. In this manner, the actuating portion 47 leaves the position between the first contact 43a and the second contact 44a and becomes spaced from the first contact 43a. Afterwards, the actuating portion 47 is moved to such a position that the actuating portion 47 contacts the third contact 45a, while contacting the second contact 44a.

A portion of the circuit breaker located forward in the movement direction of the actuating portion 47, which is a portion of the circuit breaker closer to the top portion 42a, has an outer surface tapered in the movement direction of the actuating portion 47. The third contact 45a has a substantially cylindrical shape. The inner surface of the third contact 45a is also tapered in the movement direction of the actuating portion 47. Accordingly, when the actuator 46 is actuated and the actuating portion 47 is moved, the portion of the actuating portion 47 located forward in the movement direction of the actuating portion 47 is received in the third contact 45a. Afterwards, that is, after actuation of the actuator 46, the contact surface pressure between the actuating portion 47 and the third contact 45a increases, thus ensuring reliable connection between the second contact 44a and the third contact 45a through the actuating portion 47.

As has been described, in the circuit breaker, the second contact 44a and the third contact 45a among all the contacts are connected to each other by the actuating portion 47 after the actuator 46 is actuated. When such connection is established, the actuating portion 47 of the actuator 46 is used as the connection member for connecting the second contact 44a and the third contact 45a to each other. In other words, the actuating portion 47 is used as a connection member for connecting the converter 19 and the grounding portion to each other.

Since the circuit breaker configured as described above is employed as the power supply circuit breaker 27, the actuating portion 47 is moved through actuation of the actuator 46. Movement of the actuating portion 47 interrupts the power supply path through which the power is supplied from the positive terminal of the storage battery 20 to the electric device such as the converter 19 and grounds the portion of the power supply path closer to the converter 19 than the interrupted portion. That is, interruption of the power supply path and grounding of the interrupted portion of the power supply path are performed through operation of the single actuator 46. Accordingly, compared to an apparatus having a path interrupting actuator arranged separately from a path grounding actuator, the apparatus of the first embodiment is simplified.

Further, before actuation of the actuator 46, the actuating portion 47 of the actuator 46 is used as the connection member for connecting the first contact 43*a* and the second contact 44*a* to each other, or in other words, as a portion of the power supply path. After the actuation of the actuator 46, the actuating portion 47 is used as the connection member for connecting the converter 19 and the grounding portion to each other. Accordingly, compared to an apparatus having the connection member formed separately from the actuating portion 47, the apparatus of the present embodiment is simplified.

In the vehicle 10 (FIG. 1), the generator 12 and the motor 13 both have a power generating function of generating power through forcible rotation of the rotary shaft 12*a*, 13*a*. When the vehicle 10 is towed after a car collision, the rotary shaft 12*a* of the generator 12 and the rotary shaft 13*a* of the motor 13 may be forcibly rotated along with the axle 15. In this case, the generator 12 and the motor 13 generate the power, which may excessively raise the potential of the electric circuit. Further, since the motor 13 is used as the rotary device for generating the rotation torque for driving the vehicle 10, a comparatively large-sized motor must be employed as the motor 13. Also, a comparatively large-sized inverter is used as the second inverter 18, which controls the motor 13. This increases the amount of the charge accumulated in the second inverter 18 in operation, thus causing an excessive rise of the potential in a certain portion of the electric circuit.

To solve this problem, in the present embodiment, generator circuit breakers 29 are mounted in respective three generator cables 28, each of which connects the generator 12 and the first inverter 17 to each other. The generator circuit breakers 29 interrupt the corresponding generator cables 28 when a collision of the vehicle 10 occurs. When a collision of the vehicle 10 is detected based on an output signal from the impact sensor 25, the generator circuit breakers 29 are actuated. This interrupts a generator path connecting the generator 12 and the first inverter 17 to each other, which is specifically each generator cable 28. Correspondingly, supply of the power generated by the generator 12 to the first inverter 17 is blocked. Further, when in operation, each generator circuit breaker 29 grounds the portion of the associated generator path closer to the first inverter 17 than the interrupted portion, in addition to interrupting the generator path. In the present embodiment, the generator circuit breakers 29 each function as a rotary device circuit breaker.

Each generator circuit breaker 29 is configured identical with the circuit breaker (see FIGS. 2(*a*) and 2(*b*)) used as the power supply circuit breaker 27. In each circuit breaker used as the generator circuit breaker 29, the first contact 43*a* is connected to the generator 12, and the second contact 44*a* is connected to the first inverter 17. The third contact 45*a* is connected to the grounding portion through a resistor (not shown). Specifically, the grounding portion refers specifically to the ground of the electric circuit, which is the portion of the electric circuit that is connected to the negative terminal of the storage battery 20 and has a potential substantially equal to the potential of the negative terminal. In the present embodiment, the first contact 43*a* of the circuit breaker functions as a rotary device-side contact and the second contact 44*a* functions as a controller-side contact. The third contact 45*a* functions as a rotary device ground contact.

In each generator circuit breaker 29 (see FIG. 1), the actuating portion 47 of the actuator 46 is used as a portion of the generator path connecting the generator 12 and the first inverter 17 to each other before actuation of the actuator 46 (FIG. 2(*a*)). After the actuation of the actuator 46, the actuating portion 47 is used as a connecting member for connecting the first inverter 17 and the grounding portion to each other (FIG. 2(*b*)).

Further, the actuating portion 47 is moved through the actuation of the actuator 46 of the circuit breaker mounted as the generator circuit breaker 29. Movement of the actuating portion 47 interrupts the generator path and grounds the portion of the generator path closer to the first inverter 17 than the interrupted portion. That is, interruption of each generator path and grounding of the interrupted portion of the generator path are performed through operation of the corresponding single actuator 46. Accordingly, compared to an apparatus having a path interrupting actuator arranged separately from a path grounding actuator, the apparatus of the present embodiment is simplified. Further, the actuating portion 47 of the actuator 46 is used as a portion of the corresponding generator path before the actuation of the actuator 46. The actuating portion 47 is used as the connection member for connecting the first inverter 17 and the grounding portion to each other after the actuator 46 is actuated. Accordingly, compared to an apparatus having the connection member and the actuating portion 47 that are formed separately, the apparatus of the first embodiment is simplified.

Further, in the present embodiment, motor circuit breakers 31 are mounted in respective three motor cables 30, each of which connects the motor 13 (FIG. 1) and the second inverter 18 to each other. The motor circuit breakers 31 interrupt the motor cables 30 at the time of a collision of the vehicle 10. When a collision of the vehicle 10 is detected based on an output signal from the impact sensor 25, the motor circuit breakers 31 are actuated. This interrupts motor paths each connecting the motor 13 and the second inverter 18 to each other, which paths are specifically the motor cables 30. Correspondingly, the supply of the power generated by the motor 13 to the second inverter 18 is stopped. Further, when in operation, each motor circuit breaker 31 grounds the portion of the corresponding motor path closer to the second inverter 18 than the interrupted portion, in addition to interrupting the motor path. In the present embodiment, the motor circuit breakers 31 each function as a rotary device circuit breaker.

Each motor circuit breaker 31 is configured identical with the circuit breaker (see FIGS. 2(*a*) and 2(*b*)) used as the power supply circuit breaker 27 or the generator circuit breaker 29. In each circuit breaker used as the motor circuit breaker 31, the first contact 43*a* is connected to the motor 13, and the second contact 44*a* is connected to the second inverter 18. The third contact 45*a* is connected to the grounding portion through a resistor (not shown). Specifically, the grounding portion refers to the ground of the electric circuit, which is the portion of the electric circuit that is connected to the negative terminal of the storage battery 20 and has a potential substantially equal to the potential of the negative terminal. In the present embodiment, the first contact 43*a* of the circuit breaker functions as a rotary device-side contact and the second contact 44*a* functions as a controller-side contact. The third contact 45*a* functions as a rotary device ground contact.

In each motor circuit breaker 31 (see FIG. 1), the actuating portion 47 of the actuator 46 is used as a portion of the motor path connecting the motor 13 and the second inverter 18 to each other before actuation of the actuator 46 (FIG. 2(*a*)). After the actuation of the actuator 46, the actuating portion 47 is used as a connecting member for connecting the second inverter 18 and the grounding portion to each other (FIG. 2(*b*)).

Further, the actuating portion 47 is moved through the actuation of the actuator 46 of the circuit breaker mounted as the motor circuit breaker 31. Movement of the actuating, portion 47 interrupts the corresponding motor path and grounds the portion of the motor path closer to the second inverter 18 than the interrupted portion. That is, interruption of each motor path and grounding of the interrupted portion of the motor path are performed through operation of the corresponding single actuator 46. Accordingly, compared to an apparatus having a path interrupting actuator arranged separately from a path grounding actuator, the apparatus of the present embodiment is simplified. Further, the actuating portion 47 of the actuator 46 is used as a portion of the corresponding motor path before the actuator 46 is actuated. The actuating portion 47 is used as the connection member for connecting the second inverter 18 and the grounding portion to each other after the actuator 46 is actuated. Accordingly, compared to an apparatus having the connection member and the actuating portion 47 that are formed separately, the apparatus of the present embodiment is simplified.

The use of the generator circuit breakers 29 (FIG. 1) and the motor circuit breakers 31 enables the operation described below.

Specifically, when a collision of the vehicle 10 occurs, the generator paths and the motor paths are interrupted. Accordingly, if the vehicle 10 is towed after the collision and the generator 12 and the motor 13 generate power, the generated power is prevented from being supplied to the first inverter 17 and the second inverter 18. This prevents the potential in the portion of each generator path closer to the first inverter 17 than the interrupted portion from being increased by the power generated by the generator 12, and prevents the potential of the portion of each motor path closer to the second inverter 18 than the interrupted portion from being raised by the power produced by the motor 13.

Along with the interruption of each generator path, the portion of the generator path closer to the first inverter 17 than the interrupted portion is grounded. Accordingly, at this stage, a discharging circuit is formed by a path via each generator circuit breaker 29, which is specifically a path connecting the portion of the generator path closer to the first inverter 17 than the interrupted portion to the grounding portion. Further, along with the interruption of each motor path, the portion of the motor path closer to the second inverter 18 than the interrupted portion is grounded. Accordingly, at this stage, a discharging circuit is formed by a path via each motor circuit breaker 31, or in other words, by a path connecting the portion of the motor path closer to the second inverter 18 than the interrupted portion to the grounding portion. As a result, even if charge is accumulated in the first inverter 17 and the second inverter 18, the charge is discharged through the discharging circuits. The charge is thus prevented from maintaining at high levels the potential in the portion of each generator path closer to the first inverter 17 than the interrupted portion and the potential in the portion of each motor path closer to the second inverter 18 than the interrupted portion. As a result, after the collision of the vehicle 10, the potential in the portion of each generator path closer to the first inverter 17 than the interrupted portion and the potential in the portion of each motor path closer to the second inverter 18 than the interrupted portion are prevented from being maintained at a high level.

As has been described, the present embodiment has the advantages described below.

(1) When a collision of the vehicle 10 is detected, the low explosive type actuator 46 is actuated to drive the power supply circuit breaker 27, which interrupts the power supply path connecting the positive terminal of the storage battery 20 to the converter 19. This prevents the potential in the portion of the power supply path closer to the converter 19 than the interrupted portion from being maintained at a high level by the power supplied from the storage battery 20. Further, along with the interruption of the power supply path, the portion of the power supply path closer to the converter 19 than the interrupted portion is grounded. Accordingly, even if charge is accumulated in the converter 19, the charge is prevented from maintaining the potential of the aforementioned portion closer to the converter 19 at a high level. As a result, after the collision of the vehicle 10, the potential in the portion of the power supply path closer to the converter 19 than the interrupted portion is prevented from being maintained excessively high.

(2) The power supply circuit breaker 27 interrupts the power supply path and grounds the portion of the power supply path closer to the converter 19 than the interrupted portion through movement of the actuating portion 47 caused by actuation of the actuator 46. In this manner, interruption of the power supply path and grounding of the interrupted portion of the power supply path are accomplished by driving the single power supply circuit breaker 27, or in other words, by actuating the single actuator 46. Accordingly, compared to an apparatus having a path interrupting actuator and a path grounding actuator formed separately, the apparatus of the present embodiment is simplified.

(3) The actuating portion 47 of the actuator 46 of the circuit breaker used as the power supply circuit breaker 27 is formed of conductive material. Before the actuator 46 is actuated, the actuating portion 47 is arranged at such a position that the actuating portion 47 does not contact the electric device ground contact connected to the grounding portion but contacts the storage battery-side contact connected to the positive terminal of the storage battery 20 and the electric device-side contact connected to the converter 19. After actuation of the actuator 46, the actuating portion 47 is moved to such a position that the actuating portion 47 does not contact the storage battery-side contact but contacts the electric device ground contact and the electric device-side contact. In this manner, before the actuation of the actuator 46, the actuating portion 47 of the actuator 46 is used as the connection member for connecting the storage battery-side contact and the electric device-side contact to each other, which is a portion of the power supply path. After the actuator 46 is actuated, the actuating portion 47 is used as the connection member for connecting the electric device-side contact and the electric device ground contact to each other. As a result, compared to an apparatus having the connection member formed independently from the actuating portion 47, the apparatus of the first embodiment is simplified.

(4) The outer shape of the portion of the actuating portion 47 located forward in the movement direction is tapered in the movement direction of the actuating portion 47. The inner surface of the third contact 45a, which contacts the portion of the actuating portion 47 forward in the movement direction of the actuating portion 47 after the actuating portion 47 is moved, is also tapered in the movement direction of the actuating portion 47. This raises the contact surface pressure between the actuating portion 47 and the third contact 45a after the actuator 46 is actuated. The converter 19 and the grounding portion are thus reliably connected to each other.

(5) Before the actuator 46 is actuated, the actuating portion 47 of the actuator 46 is clamped between the first contact 43a and the second contact 44a before the actuator 46 is actuated. Accordingly, before actuation of the actuator 46, the actuating portion 47 connects the converter 19 and the positive terminal of the storage battery 20 to each other.

(6) When a collision of the vehicle 10 is detected, the generator circuit breakers 29 are driven to interrupt the generator paths each connecting the generator 12 and the first inverter 17 to each other. The motor circuit breakers 31 are also actuated to interrupt the motor paths each connecting the motor 13 and the second inverter 18 to each other. This prevents the potential in the portion of each generator path closer to the first inverter 17 than the interrupted portion from being increased by the power generated by the generator 12. Also, the potential in the portion of each motor path closer to the second inverter 18 than the interrupted portion is prevented from being increased by the power produced by the motor 13. Further, along with the interruption of the generator paths, the portion of each generator path closer to the first inverter 17 than the interrupted portion is grounded. Likewise, along with the interruption of the motor paths, the portion of each motor path closer to the second inverter 18 than the interrupted portion is grounded. Accordingly, after the collision of the vehicle 10, the potential in the portion of each generator path closer to the first inverter 17 than the interrupted portion and the potential in the portion of each motor path closer to the second inverter 18 than the interrupted portion are prevented from being maintained at excessively high levels.

(7) The actuating portion 47 is moved through actuation of the actuator 46 of the circuit breaker mounted as the generator circuit breaker 29. Movement of the actuating portion 47 interrupts the corresponding generator path and grounds the portion of the generator path closer to the first inverter 17 than the interrupted portion. The actuating portion 47 is moved through actuation of the actuator 46 of the circuit breaker mounted as the motor circuit breaker 31. Movement of the actuating portion 47 interrupts the corresponding motor path and grounds the portion of each motor path closer to the second inverter 18 than the interrupted portion. Accordingly, interruption of each path and grounding of the interrupted portion of the path are performed through actuation of the corresponding single actuator 46. As a result, compared to an apparatus having a generator path interrupting actuator formed independently from a generator path grounding actuator or an apparatus having a motor path interrupting actuator formed separately from a motor path grounding actuator, the apparatus of the present embodiment is simplified.

(8) The actuating portion 47 of the actuator 46 of the circuit breaker arranged as the generator circuit breaker 29 is used as a portion of the corresponding generator path before the actuator 46 is actuated. After actuation of the actuator 46, the actuating portion 47 is used as the connection member for connecting the first inverter 17 and the grounding portion to each other. The actuating portion 47 of the actuator 46 of the circuit breaker mounted as the motor circuit breaker 31 is used as a portion of the corresponding motor path before the actuator 46 is actuated. After actuation of the actuator 46, the actuating portion 47 is used as the connection member for connecting the second inverter 18 and the grounding portion to each other. This simplifies the configuration of the apparatus of the first embodiment compared to an apparatus in which the actuating portion 47 of the circuit breaker arranged as the generator circuit breaker 29 or the motor circuit breaker 31 is formed independently from the aforementioned connection member.

(9) The vehicle 10 includes the motor 13, which has the torque producing function of producing rotation torque for driving the vehicle 10. That is, in the vehicle 10, a great amount of charge is easily accumulated in the second inverter 18, which controls the motor 13. However, the potential in a portion of the electric circuit is prevented from being maintained excessively high by the accumulated charge.

Second Embodiment

An electric circuit breaker apparatus for a vehicle according to a second embodiment of the present invention will hereafter be described mainly about differences from the first embodiment.

The electric circuit breaker apparatus of the present embodiment is different from the electric circuit breaker apparatus of the first embodiment only in terms of the configuration of each of the circuit breakers used as the power supply circuit breaker 27 (FIG. 1), the generator circuit breakers 29, and the motor circuit breakers 31. The configuration of each circuit breaker according to the present embodiment will be described below.

Figure 3A:
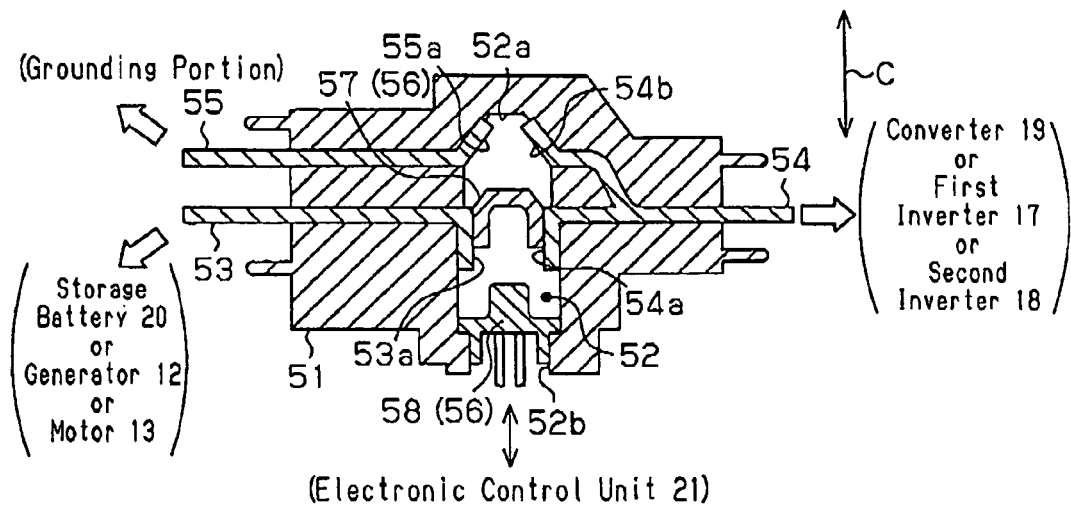
FIG. 3(a) is a cross-sectional view showing the interior of an electric circuit breaker according to a second embodiment of the invention.
Figure 3B:
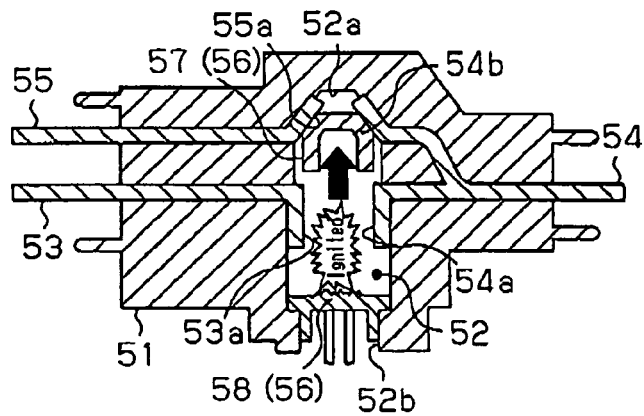
FIG. 3(b) is a cross-sectional view showing a state of the circuit breaker shown in FIG. 3(a) after actuation.

FIG. 3 illustrates the interior of the circuit breaker of the present embodiment. Specifically, FIG. 3(a) illustrates the interior of the circuit breaker before actuation of an actuator. FIG. 3(b) illustrates the interior of the circuit breaker after the actuation of the actuator.

With reference to FIGS. 3(a) and 3(b), a casing 51 of the circuit breaker has an internal space 52 formed therein.

The circuit breaker includes three terminals, which are formed at separate positions and connect the internal space 52 to the exterior of the casing 51. The three terminals are a first terminal 53, a second terminal 54, and a third terminal 55.

The first terminal 53 has a first contact 53a, which functions as a storage battery-side contact. The second terminal 54 includes a second contact 54a, which functions as an electric device-side contact. The first contact 53a and the second contact 54a are located in the inner circumferential surface of the casing 51 and exposed at central positions in the axial direction of the internal space 52, which is indicated by arrow C in FIG. 3(a). Further, the second terminal 54 has a portion different from the second contact 54a, which is a fourth contact 54b functioning as an electric device-side contact. The fourth contact 54b is exposed at on end of the axial direction of the internal space 52, which is a position in the inner surface of a top portion 52a spaced from the second contact 54a. The third terminal 55 has a third contact 55a, which functions as an electric device ground contact. The third contact 55a is exposed at a position in the inner surface of the top portion 52a of the internal space 52 spaced from the fourth contact 54b.

When the circuit breaker is used as the power supply circuit breaker 27, the first terminal 53 is connected to the positive terminal of the storage battery 20 and the second terminal 54 is connected to the converter 19. The third terminal 55 is connected to the grounding portion through a resistor (not shown). The grounding portion specifically refers to the ground of the electric circuit, which is the portion of the electric circuit that is connected to the negative terminal of the storage battery 20 and has a potential substantially equal to the potential of the negative terminal of the storage battery 20. When the circuit breaker is used as the generator circuit breaker 29, the first terminal 53 is connected to the generator 12, the second terminal 54 is connected to the first inverter 17, and the third terminal 55 is connected to the grounding portion. When the circuit breaker is used as the motor circuit breaker 31, the first terminal 53 is connected to the motor 13, the second terminal 54 is connected to the second inverter 18, and the third terminal 55 is connected to the grounding portion.

The circuit breaker incorporates a low explosive type actuator 56. The actuator 56 has a substantially columnar actuating portion 57, which is arranged in the internal space 52, and a gas generating portion 58 for generating combustion gas by igniting and burning low explosive in response to a signal from the electronic control unit 21. The gas generating portion 58 is attached to a bottom portion 52b at a position at one end of the internal space 52 in the axial direction of the internal space 52, that is, between the bottom portion 52b and the actuating portion 57. When the low explosive is ignited and burned in the gas generating portion 58 and combustion gas is produced, the combustion gas presses the actuating portion 57. This moves the actuating portion 57 from the bottom portion 52b to the top portion 52a in the internal space 52. In the present embodiment, the actuating portion 57 functions as both a movement member and a movable member.

The circuit breaker operates as described below.

As illustrated in FIG. 3(a), before the actuator 56 is actuated, the actuating portion 57 is located at such a position that the actuating portion 57 contacts neither the third contact 55a nor the fourth contact 54b. Specifically, at this stage, the actuating portion 57 is located at such a position that the actuating portion 57 contacts the first contact 53a and the second contact 54a. In other words, the actuating portion 57 is clamped between the first contact 53a. and the second contact 54a. The actuating portion 57 is formed of conductive material, which is material with a high electric conductivity such as iron based material. Accordingly, before the actuator 56 is actuated, the first terminal 53 and the second terminal 54 are connected to each other through the actuating portion 57, among the terminals provided in the circuit breaker. When such connection is brought about, the actuating portion 57 of the actuator 56 is used as a connection member for connecting the first contact 53a of the first terminal 53 and the second contact 54a of the second terminal 54 to each other.

After the actuator 56 is actuated as illustrated in FIG. 3(b), the actuating portion 57 is arranged at such a position that the actuating portion 57 contacts neither the first contact 53a nor the second contact 54a. Specifically, the actuating portion 57 is located at such a position that the actuating portion 57 contacts the third contact 55a and the fourth contact 54b, or specifically the actuating portion 57 is received in the clearance between the third contact 55a and the fourth contact 54b and clamped between the third contact 55a and the fourth contact 54b.

A portion of the circuit breaker located forward in the movement direction of the actuating portion 57, which is a portion of the circuit breaker closer to the top portion 52a, has an outer surface that is tapered in the movement direction of the actuating portion 57. The third contact 55a and the fourth contact 54b are shaped in such a manner that the interval therebetween becomes smaller in the movement direction of the actuating portion 57. Accordingly, after the actuator 56 is actuated, the inner surface of the portion contacting the portion of the actuating portion 57 located forward in the movement direction of the actuating portion 57 is tapered in the movement direction of the actuating portion 57. Accordingly, when the actuator 56 is actuated and the actuating portion 57 is moved, the portion of the actuating portion 57 located forward in the movement direction of the actuating portion 57 is received in the clearance between the third contact 55a and the fourth contact 54b. Afterwards, that is, after actuation of the actuator 56, the contact surface pressure between the third contact 55a and the actuating portion 57 and the contact surface pressure between the fourth contact 54b and the actuating portion 57 rise, thus ensuring reliable connection between the third contact 55a and the fourth contact 54b through the actuating portion 57.

As has been described, in the circuit breaker, the second terminal 54 and the third terminal 55 among all the terminals, are connected to each other by the actuating portion 57 of the actuator 56 after the actuator 56 is actuated. When such connection is established, the actuating portion 57 of the actuator 56 is used as the connection member for connecting the fourth contact 54b of the second terminal 54 and the third contact 55a of the third terminal 55 to each other.

The present embodiment has the advantages described below in addition to the same advantages as those described in the items (1) to (3) and (5) to (9).

(10) The outer surface of the portion of the actuating portion 57 located forward in the movement direction of the actuating portion 57 is tapered in the movement direction of the actuating portion 57. The third contact 55a and the fourth contact 54b are shaped in such a manner that the interval between the third contact 55a and the fourth contact 54b becomes smaller in the movement direction of the actuating portion 57. This raises the contact surface pressure between the third contact 55a and the actuating portion 57 and the contact surface pressure between the fourth contact 54b and the actuating portion 57 after the actuator 56 is actuated. As a result, the third contact 55a and the fourth contact 54b are reliably connected to each other through the actuating portion 57.

Third Embodiment

An electric circuit breaker apparatus for a vehicle according to a third embodiment of the present invention will be described mainly about differences from the first and second embodiments.

The electric circuit breaker apparatus of the present embodiment is different from the electric circuit breaker apparatuses of the first and second embodiments only in terms of the configuration of each of the circuit breakers used as the power supply circuit breaker 27 (FIG. 1), the generator circuit breakers 29, and the motor circuit breakers 31. The configuration of each circuit breaker according to the present embodiment will be described below.

Figure 4A:
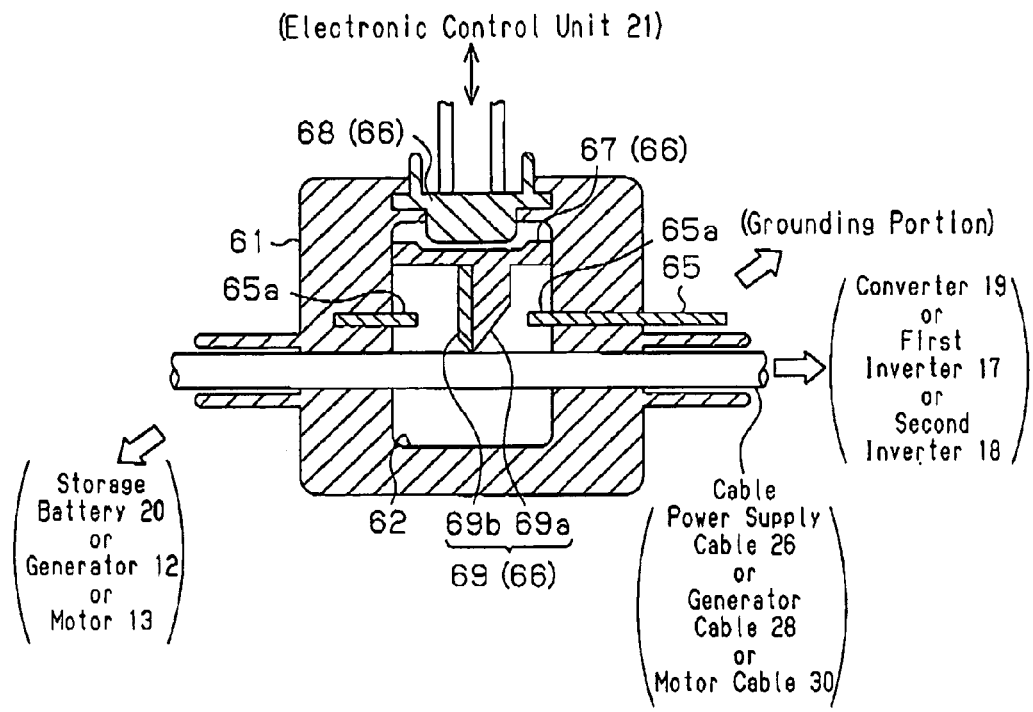
FIG. 4(a) is a cross-sectional view showing the interior of an electric circuit breaker according to a third embodiment of the invention.
Figure 4B:
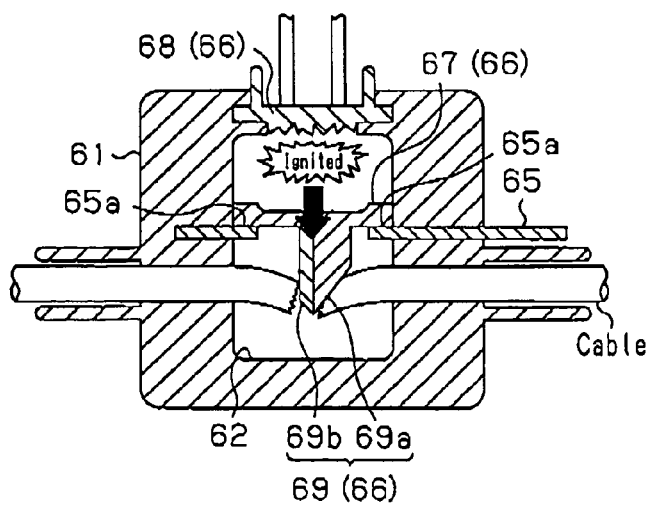
FIG. 4(b) is a cross-sectional view showing a state of the circuit breaker shown in FIG. 4(a) after actuation.

FIG. 4 shows the interior of the circuit breaker of the present embodiment. Specifically, FIG. 4(a) illustrates the interior of the circuit breaker before actuation of an actuator. FIG. 4(b) illustrates the interior of the circuit breaker after the actuation of the actuator.

With reference to FIGS. 4(a) and 4(b), a casing 61 of the circuit breaker has an internal space 62 formed in the casing 61. Such circuit breakers are attached to cables, which are specifically the power supply cable 26, the generator cables 28, and the motor cables 30. The cables each extend through the internal space 62 of the corresponding circuit breaker.

The circuit breaker incorporates a low explosive type actuator 66. The actuator 66 has an actuating portion 67, which is arranged in the internal space 62, and a gas generating portion 68. The gas generating portion 68 generates combustion gas by igniting and burning low explosive in response to a signal input by the electronic control unit 21.

The actuating portion 67 is formed of conductive material, which is material with a high electric conductivity such as iron based material. The actuating portion 67 is located at a position in the internal space 62 spaced from the corresponding one of the aforementioned cables. A cutter 69, which has a thin and sharp distal end, is formed integrally with the portion of the actuating portion 67 closer to the cable. A distal portion of the cutter 69 extends in a direction crossing the direction in which the cable extends. A portion of the cutter 69 at one side of the extending direction of the cable, which is a conductive portion 69a, is formed of conductive material. A portion of the cutter 69 at the other side of the extending direction of the cable, which is an insulating portion 69b, is formed of insulating material. The insulating material is formed by material with an extremely low electric conductivity such as resin material.

The gas generating portion 68 is located at such a position that the gas generating portion 68 is exposed to the internal space 62. The gas generating portion 68 is mounted at a position facing a portion of the actuating portion 67 opposite to the portion in which the cutter 69 is formed.

When the low explosive is ignited and burned in the gas generating portion 68 and combustion gas is generated, the combustion gas presses the actuating portion 67. This moves the actuating portion 67 in such a manner as to press the distal end of the cutter 69 against the cable. In the present embodiment, the actuating portion 67 and the cutter 69 function as a movement member and a movable member.

The circuit breaker also includes a terminal 65, which connects the interior of the casing 61 to the exterior. The terminal 65 has a contact 65a. Before the actuator 66 is actuated, the contact 65a is exposed at a position in the internal space 62 spaced from the actuating portion 67 and the conductive portion 69a. The contact 65a is shaped in such a manner that, after the actuator 66 is actuated, the actuating portion 67 hits and contacts the contact 65a. Regardless of whether the circuit breaker is used as any of the power supply circuit breaker 27, the generator circuit breaker 29, ad the motor circuit breaker 31, the terminal 65 is connected to the grounding portion through a resistor (not shown). The grounding portion, which is specifically the ground of the electric circuit, refers to the portion of the electric circuit that is connected to the negative terminal of the storage battery 20 and has a potential substantially equal to the potential of the negative terminal of the storage battery 20.

Operation of the circuit breaker will hereafter be described.

With reference to FIG. 4(*a*), before actuation of the actuator 66, connection by the cable is maintained with an insulating state maintained between the actuating portion 67 and the conductive portion 69a of the cutter 69 and the conductive wire in the cable.

As illustrated in FIG. 4(*b*), after the actuator 66 is actuated and the actuating portion 67 moves, the distal end of the cutter 69 presses and cuts the cable while moving. Afterwards, when the actuating portion 67 reaches such a position that the actuating portion 67 hits and contacts the terminal 65, movement of both the actuating portion 67 and the cutter 69 stops. In this manner, the cable is cut physically by the cutter 69.

In this state, one of two cut surfaces of the cable, or the cut surface connected to the first inverter 17, the second inverter 18, or the converter 19, contacts only the conductive portion 69a of the cutter 69. The cut surface is thus connected to the terminal 65 through the conductive portion 69a and the actuating portion 67. The other one of the cut surfaces, which is the cut surface connected to the positive terminal of the storage battery 20 or the generator 12 or the motor 13 contacts only the insulating portion 69b of the cutter 69.

As has been described, in the circuit breaker of the third embodiment, the actuating portion 67 and the cutter 69 move in a direction crossing the cable after the actuator 66 is actuated. Through such movement, the cable extending through the interior of the circuit breaker is physically cut. One of two cut sections of the cable, which is the section connected to the first inverter 17, the second inverter 18, or the converter 19, is connected to the conductive portion 69a of the cutter 69.

The present embodiment has the same advantages as the advantages described in the above listed items (1), (2), (6), (7), and (9).

Other Embodiments

The illustrated embodiments may be modified to the forms described below.

In the first embodiment, the outer surface of the portion of the actuating portion 47 of the actuator 46 located forward in the movement direction of the actuating portion 47 is tapered in the movement direction of the actuating portion 47. However, the outer shape of this portion may be changed into any suitable shape as needed. The inner surface of the third contact 45a is tapered in the movement direction of the third contact 45a. However, the shape of the inner surface of the third contact 45a may be modified into any suitable shape as needed. Specifically, as long as a sufficient contact surface area and sufficient contact surface pressure are ensured in a contact portion between the actuating portion 47 and the third contact 45a after actuation of the actuator 46, the outer shape of the aforementioned portion of the actuating portion 47 and the shape of the inner surface of the third contact 45a may be modified into any suitable shapes.

In the second embodiment, the outer shape of the actuating portion 57 and the shapes of the third contact 55a and the fourth contact 54b may be changed in any suitable manners. Specifically, as long as a sufficient contact surface area and sufficient contact surface pressure are ensured in a contact portion between the actuating portion 57 and the third contact 55a and in a contact portion between the actuating portion 57 and the fourth contact 54b after the actuator 56 is actuated, the outer shape of the actuating portion 57 and the shapes of the third contact 55a and the fourth contact 54b may be modified into any suitable shapes.

In the second embodiment, the shape of the internal space 52 and the shape of the actuating portion 57 may be changed in any suitable manners. Specifically, the internal space 52 and the actuating portion 57 may be shaped in any suitable manners as long as the actuating portion 57 is moved into the clearance between the third contact 55a and the fourth contact 54b after the actuator 56 is actuated.

In the third embodiment, each circuit breaker is attached to a cable such as the power supply cable 26, the generator cable 28, or the motor cable 30. In this state, the cable extends through the circuit breaker. However, instead of this circuit breaker, a circuit breaker having two terminals and a conductive wire connecting the terminals together may be used. In this case, two separate cables may be connected to the corresponding two terminals. In this arrangement, the conductive wire forms a portion of the cables. This configuration allows the cutter 69 to cut the conductive wire. In this case, only one of cut portions of the conductive wire, which is, for example, the cut portion connected to the first inverter 17 or the second inverter 18 or the converter 19 is connected to the conductive portion 69a of the cutter 69.

In each of the illustrated embodiments, either or both the generator circuit breakers 29 and the motor circuit breakers 31 may be omitted.

In each of the illustrated embodiments, the employed circuit breaker accomplishes interruption of a path and grounding of the interrupted portion of the path through actuation of a single actuator. However, a circuit breaker having a path interrupting actuator formed independently from a path grounding actuator may be employed. Alternatively, the power supply circuit breaker 27, the generator circuit breakers 29, and the motor circuit breakers 31 may be configured each by two circuit breakers, which are a path interrupting circuit breaker and a path grounding circuit breaker.

Other than a generator or a motor or an inverter or a converter, the present invention may be used in a vehicle including any suitable electric device driven by the power supplied from a storage battery.

Therefore, the present examples and embodiments are to be considered as illustrative and not restrictive and the invention is not to be limited to the details given herein, but may be modified within the scope and equivalence of the appended claims.

The invention claimed is:

1. An electric circuit breaker apparatus used in a vehicle having an electric circuit including an electric device and a storage battery for supplying power to the electric device, the electric circuit breaker apparatus interrupting supply of the power from the storage battery to the electric device when a collision of the vehicle is detected, the apparatus comprising:
   a power supply path connecting the electric device and a positive terminal of the storage battery to each other; and
   a power supply circuit breaker arranged in the power supply path,
   wherein the power supply circuit breaker includes a low explosive type first actuator, the first actuator being actuated to drive the power supply circuit breaker when the collision is detected, and
   wherein, when the first actuator is actuated, the power supply circuit breaker interrupts the power supply path and grounds a portion of the power supply path closer to the electric device than the interrupted portion,
   wherein the first actuator has a movement member that moves when the first actuator is actuated,
   wherein the power supply circuit breaker performs interruption of the power supply path and grounding of the portion of the power supply path closer to the electric device based on movement of the movement member,
   wherein the power supply path is formed by a cable,
   wherein the movement member has a cutter formed at a distal portion, the cable being cut by the cutter when the movement member moves in a direction crossing the cable in response to actuation of the first actuator, and
   wherein a first portion of the cutter at one side of an extending direction of the cable is formed of a conductive material, and a second portion of the cutter at the other side of the extending direction of the cable is formed of an insulating material.

2. The electric circuit breaker apparatus according to claim 1,
   wherein the vehicle includes a rotary device having a power generating function of generating power through forcible rotation of a rotary shaft caused by an axle of the vehicle and a controller for controlling operation of the rotary device, and
   wherein the electric circuit breaker apparatus further includes:
   a rotary device path connecting the rotary device and the controller to each other; and
   a rotary device circuit breaker arranged in the rotary device path,
   wherein the rotary device circuit breaker includes a low explosive type second actuator, the second actuator being actuated to drive the rotary device circuit breaker when the collision is detected, and
   wherein, when the second actuator is actuated, the rotary device circuit breaker interrupts the rotary device path and grounds a portion of the rotary device path closer to the controller than the interrupted portion.

3. The electric circuit breaker apparatus according to claim 2,
   wherein the second actuator has a movable member that moves when the second actuator is actuated, and
   wherein the rotary device circuit breaker performs interruption of the rotary device path and grounding of the portion of the rotary device path closer to the controller both based on movement of the movable member.

4. The electric circuit breaker apparatus according to claim 2, wherein the rotary device has a torque producing function of producing a rotation torque for driving the vehicle.

5. An electric circuit breaker apparatus used in a vehicle having an electric circuit including an electric device and a storage battery for supplying power to the electric device, the electric circuit breaker apparatus interrupting supply of the power from the storage battery to the electric device when a collision of the vehicle is detected, the apparatus comprising:
   a power supply path, formed by a cable, connecting the electric device and a positive terminal of the storage battery to each other; and
   a power supply circuit breaker arranged in the power supply path, the power supply circuit breaker including
      a low explosive type first actuator configured to be actuated when the collision is detected, and
      a movement member configured to move toward the cable when the first actuator is actuated, the movement member including a cutter formed to face the cable, a first portion of the cutter at a first extending direction of the cable being formed of a conductive material, and a second portion of the cutter at a second extending direction of the cable being formed of an insulating material,
   wherein the cutter is configured to cut the cable when the movement member moves in a direction crossing the cable in response to actuation of the first actuator, and
   wherein, the movement member is configured such that when the cutter cuts the cable, the cutter interrupts the power supply path and grounds a portion of the power supply path closer to the electric device than the interrupted portion.

6. The electric circuit breaker apparatus according to claim 5,
   wherein the power supply circuit breaker further comprises a grounding terminal connected to ground, and
   wherein the movement member is configured such that when the cutter cuts the cable, the first portion of the cutter connects the portion of the power supply path closer to the electric device to the grounding terminal.

* * * * *